United States Patent [19]

Wilkins

[11] Patent Number: 5,016,267

[45] Date of Patent: May 14, 1991

[54] INSTRUMENTATION FOR CONDITIONING X-RAY OR NEUTRON BEAMS

[75] Inventor: Stephen W. Wilkins, Victoria, Australia

[73] Assignee: Commonwealth Scientific and Industrial Research, Australia

[21] Appl. No.: 332,846

[22] PCT Filed: Aug. 14, 1987

[86] PCT No.: PCT/AU87/00262

§ 371 Date: Mar. 20, 1989

§ 102(e) Date: Mar. 20, 1989

[87] PCT Pub. No.: WO88/01428

PCT Pub. Date: Feb. 25, 1988

[30] Foreign Application Priority Data

Aug. 15, 1986 [AU] Australia ........................ PH7494/86
Mar. 4, 1987 [AU] Australia ........................ PI0670/87

[51] Int. Cl.[5] ........................ G21K 1/06; G01T 3/00

[52] U.S. Cl. ........................ 378/84; 378/85; 378/147; 378/149; 378/150; 250/370.05; 250/390.1

[58] Field of Search ........................ 378/84, 85, 147, 149, 378/150; 250/370.05, 390.10

[56] References Cited

U.S. PATENT DOCUMENTS 2,638,554 5/1953 Bartow et al. ........................ 378/147
2,688,095 8/1954 Andrews ........................ 378/147
3,543,024 11/1970 Kantor .
4,028,547 6/1977 Eisenberger ........................ 378/85
4,081,687 3/1978 York et al. ........................ 378/149
4,125,776 11/1978 Tosswill et al. ........................ 378/149
4,223,219 9/1980 Born et al. ........................ 378/84
4,256,961 3/1981 Shoji et al. ........................ 378/85
4,411,013 10/1983 Takasu et al. ........................ 378/34

(List continued on next page.)

FOREIGN PATENT DOCUMENTS 0244504 3/1987 European Pat. Off. .
3507340 9/1985 Fed. Rep. of Germany ...... 378/147
1012360 12/1979 U.S.S.R. .
1047596 1/1966 United Kingdom .
2148680 5/1985 United Kingdom ........................ 378/147

OTHER PUBLICATIONS

International Search Report.
"Order Sorting, Focusing and Polarizing Monolithic Monochromators for Synchrotron Radiation" by V. O. Kostroun, Nuclear Instruments and Methods, vol. 172; No. 1,2, May, 1980; pp. 215–222, North-Holland Publishing Co.

*Primary Examiner*—Edward P. Westin
*Assistant Examiner*—Kim-Kwok Chu
*Attorney, Agent, or Firm*—Sughrue, Mion, Zinn Macpeak & Seas

[57] ABSTRACT

In one embodiment, an x-ray neutron instrument includes an x-ray or neutron lens (10) disposed in a path for x-rays or neutrons in the instrument. The lens (10) comprises multiple elongate open-ended channels (12) arranged across the path to receive and pass segments of an x-ray or neutron beam (14). The channels (12) have side walls reflective to x-rays or neutrons of the beam incident at a grazing angle less than the critical grazing angle for total external reflection of the x-rays or neutrons, whereby to cause substantial focusing or collimation and/or concentration of the thus reflected x-rays or neutrons. In a different embodiment, a condensing-collimating channel-cut monochromator comprises a channel (22) in a perfect-crystal or near perfect-crystal body (20). This channel (22) is formed with lateral surfaces (24, 26) which multiply reflect, by Bragg diffraction from selected Bragg planes, an incident beam (28) which has been collimated at least to some extent. The lateral surfaces (24, 26) are at a finite angle to each other whereby to monochromatize and spatially condense the beam (28) as it is multiply reflected, without substantial loss of reflectivity or transmitted power.

26 Claims, 9 Drawing Sheets

U.S. PATENT DOCUMENTS

| | | | |
|---|---|---|---|
| 4,461,018 | 7/1984 | Ice et al. | 378/82 |
| 4,698,833 | 10/1987 | Keem et al. | 378/84 |
| 4,741,012 | 4/1988 | Duinker et al. | 378/147 |

OTHER PUBLICATIONS

"Monolithic Crystal Monochromators for Syncrhotron Radiation with Order Sorting and Polarizing Properties" by G. Materlik et al., Review of Scient. Instr.; vol. 51, No. 1, Jan. 1980; pp. 86–94; U.S. Institute of Physics, N.Y., U.S.A.

"X-ray Crystal Collimators using Successive Asymmetric Diffractions and their Applications to Measurements of Diffraction Curves; III. Type II Collimator" by T. Matsushita et al., Journal of the Physical Society of Japan, vol. 30; No. 4, Apr. 1971, pp. 1136–1144.

"X-ray l"Light Pipes"" by D. Mosher et al., Applied Physics Letters, vol. 29, No. 2, Jul. 15, 1976; pp. 105–107, American Institute of Physics.

"Spectroscopic Applications of Structures Produced by Orientation-Dependent Etching", by D. J. Nagel et al., Nuclear Instruments and Methods, vol. 172; No. 1,2, May 1980, pp. 321–326.

$\alpha_1 = 0$; $\alpha_2 = 10°$ $\alpha_3 = -10°$; $\alpha_4 = 10°$

NEGATIVE ASYMMETRY $\alpha < 0$; $b < 1$

SYMMETRIC CASE $\alpha = 0$; $b = 1$

POSITIVE ASYMMETRY $\alpha > 0$; $b > 1$

INSTRUMENTATION FOR CONDITIONING X-RAY OR NEUTRON BEAMS

This invention is concerned generally with x-ray and neutron beam instrumentation. In a first aspect, the invention relates to the focusing and collimation of x-rays or neutrons and provides both a method of focusing or collimating x-rays or neutrons and an x-ray or neutron instrument. In a second aspect the invention provides a condensing-collimating monochromator.

BACKGROUND OF THE INVENTION

X-ray mirrors of various types have long been used in some x-ray scattering instruments to provide a means of focusing x-rays and improving flux and intensity, relative to pin-hole optics, by increasing the angular acceptance of the system with respect to the x-ray source. These methods for enhancing intensity have not found widespread application in x-ray scattering instruments because they lack spatial compactness, and flexibility in use, and are awkward to align. In the case of x-ray optical systems, simultaneous high-resolution in wavelength, angular collimation and spatial extent are usually achievable only at the expense of considerable loss in flux and intensity.

An early proposal for an x-ray collimator consisted of two glass plates facing each other at a small angle. This principle was extended in a conical x-ray guide tube proposed by Nozaki and Nakazawa [J. Appl. Cryst. (1986) 19,453].

In a recent paper, Yamaguchi et al [Rev. Sci. Instrum. 58(1), Jan. 1987, 43], there has been proposed a two dimensional imaging x-ray spectrometer utilizing a channel plate or capillary plate as a collimator. It is apparent that Yamaguchi et al are treating the channel plate as a large aperture device acting solely as a set of Soller slits consisting of an array of channels surrounded by opaque walls.

SUMMARY OF THE INVENTION

It is an object of the invention, in its first aspect, to provide for focusing and collimation of x-ray beams as an aid to achieving both optimum angular resolution and optimum intensity in x-ray optical systems. It is believed that the solutions disclosed herein are also useful in the field of neutron scattering and in other instruments.

The invention accordingly provides, in its first aspect, an x-ray or neutron instrument incorporating x-ray or neutron lens means disposed in a path for x-rays or neutrons in the instrument, the lens means comprising multiple elongate open-ended channels arranged across the path to receive and pass segments of an x-ray or neutron beam occupying said path, which channels have side walls reflective to x-rays or neutrons of said beam incident at a grazing angle less than the critical grazing angle for total external reflection of the x-rays or neutrons, whereby to cause substantial focusing or collimation of the thus reflected x-rays or neutrons.

The invention also provides a method of focusing, collimating and/or concentrating an x-ray or neutron beam, comprising directing the beam into the open ends of multiple elongate open-ended channels which have side walls reflective to said x-rays or neutrons incident at a grazing angle less than the critical grazing angle for total external reflection of the x-rays or neutrons, at least a portion of said beam being incident at a grazing angle less than said critical grazing angle so that the beam is at least in part focused or collimated.

The instrument will typically though not necessarily include a source of x-rays and may have one or more slit assemblies, a monochromator, a sample goniometer stage and/or adjustable x-ray detector.

Advantageously, the inclinations of the side walls are uniform in each channel but progressively change from channel to channel with respect to the optical axis of said path whereby to enhance focusing or collimation of said incident beam.

Preferably, the outer side wall of each channel itself varies in inclination along the length of the channel to further enhance said focusing and collimation.

The device is preferable such that these inclinations can be adjusted, at least finely, on installation of the device in the instrument.

As employed herein, the terms "focus" and "collimate" are not strictly confined to beams convergent to a focus or substantially parallel, but respectively include at least a reduction or increase in the angle of convergence or divergence of at least a part of the x-ray beam in question. The term "lens" embraces beam concentration devices generally. The term "channel", as employed in the art, does not specifically indicate an open-sided duct but also embraces wholly enclosed passages, bores and capillaries.

The channels are preferably hollow capillaries or other bores and may comprise collectively a micro-capillary or micro-channel plate. For example, the latter may be formed of multiple hollow optical fibres or multiple optical fibres from which the core has been etched out. In general, the interior of the channels can be air and should be of a higher refractive index for x-rays than the surrounds. This requirement is met by hollow air filled ducts or channels in a suitable glass.

An alternative micro-capillary device may comprise a thin film, for example of methyl methacrylate, through which multiple elongate holes have been burned, for example by means of electron beam lithography. The film thickness, and therefore the lengths of the holes, may be of the order several micron while the width of the holes may be around 100 angstrom.

A quite different embodiment of the device may consist of a stack of thin, highly polished x-ray reflective metal sheets held apart by suitable spacers. This embodiment would be very suitable for use with line sources.

For optimum efficiency with only one reflection in each channel, the channels should have a diameter to length ratio d/t approximately equal to said critical angle, $\gamma_c$. In general, d/t is preferably in the range one to two times $\gamma_c$.

It will be appreciated that not all rays will necessarily intercept channel walls and that a substantial portion of the x-ray beam will typically be absorbed in the channel walls or pass undeviated through the focusing device.

In an advantageous application of the invention, the x-ray lens device comprises a micro-capillary plate which is curved so that the angular tilts of the reflecting side walls in the channels vary parabolically with distance perpendicular to the optical axis. By parabolic bending in one or two dimensions, appropriate focusing and collimating effects may be simultaneously produced in the two dimensions-and may well be different in the two dimensions.

Preferably, the side walls of the channels are good reflectors of x-rays and have a large value for the critical grazing angle $\gamma_c$ for total external reflection of x-rays. The side walls may be treated to enhance these properties, for example by coating them in gold. A larger $\gamma_c$ may be produced by applying a suitable thin-filmed coating on the side walls of the channels with a denser material such as gold or lead (for example by reduction of a lead glass micro-channel plate in a hydrogen atmosphere, or by vapour deposition).

Micro-channel plates suitable for application of the invention may consist of an array of nearly parallel hollow optical fibres or optical fibres from which the core has been etched or otherwise removed. Channels may be typically of diameter in the 1-100 micron range and may have typical length to diameter ratios in the range 40-500. The channel or capillary matrix may be fabricated from lead glass.

BACKGROUND OF THE INVENTION

Turning to the second aspect of the invention, the highest resolution small angle x-ray scattering systems developed to date have been those based on the Bonse-Hart diffractometer which utilizes two parallel grooved channel-cut perfect-crystals, one for the collimator-monchromator and the second for the collimator-analyser. These systems are capable of both extremely high angular resolution of the order of one second of arc and high intensity, since the two collimator monochromators operate in a non-dispersive mode. The principal disadvantage of systems of the Bonse-Hart type is that the intensity at each scattering angle is collected separately and so the collection of a complete set of data will be quite time consuming, especially if two dimensional scattering data is required. This disadvantage becomes even more significant if the sample or diffraction conditions are changing with time.

A further disadvantage is the quite wide beam required to achieve high intensities, rendering the system rather inefficient for narrow samples or for scanning large samples.

The data collection times can be greatly improved, however, by employing the recently developed position-sensitive detectors of, for example, the micro-channel plate, diode array or charge-coupled device type, in which each detection pixel is of a width as small as 1 micron. Conventional channel-cut perfect crystal monochromators are not capable of spatially condensing the x-ray beam to this extent and indeed, as just mentioned, a quite wide beam is often unavoidable. Thus it is not possible to realize the full potential of position-sensitive detectors with Bonse-Hart type x-ray diffraction systems. Improved beam condensation is also desirable where imaging techniques are used, such as with photographic film or imaging plates.

Kikuta and Kohra (J. Phys. Soc. Japan 29 (1970) 1322) have described an arrangement for reducing the angular spread of an x-ray beam by employing successive asymmetric Bragg diffractions at perfect-crystal faces. This was effective for the purpose but gave rise to a corresponding increase in the spatial width of the beam.

SUMMARY OF THE INVENTION

It is an object of the invention, in its second aspect, to provide an improved condensing-collimating monochromator which exhibits an enhanced beam condensing property when compared with prior channel-cut crystal monochromators.

The invention accordingly provides, in its second aspect, a condensing-collimating channel-cut monochromator comprising a channel in a perfect-crystal or near perfect-crystal body, which channel is formed with lateral surfaces which multiply reflect, by Bragg diffraction, an incident beam which has been collimated at least to some extent, wherein said lateral surfaces are at a finite angle to each other whereby to monochromatize and spatially condense said beam as it is multiply reflected, without substantial loss of reflectivity or transmitted power. By "substantial loss" is meant a reduction by more than one order of magnitude.

This aspect of the invention effectively entails the employment of successive asymmetric Bragg deffractions at perfect-crystal faces to spatially condense an incident beam, in contrast to the spatial broadening described in the Kikuta et al article. It is very surprising that condensation can be achieved similtaneously with collimation, monochromatisation and high reflectivity, the latter resulting in good intensity and flux. The result is a very versatile general purpose instrument.

The lateral surfaces may provide a significant increase in intensity of the exit beam relative to that of the partially collimated incident beam when measured over the given band-pass and angle of acceptance of the monochromator.

The lateral surfaces of the channel may also further collimate the incident beam by virtue of the effect of partial overlap of the reflectivity curves for each surface.

The beam may comprise, for example, an x-ray beam or a beam of neutrons.

It is also found that the respective asymmetry angles for said lateral surfaces (i.e. the angle between the respective surfaces and a selected Bragg plane), should be jointly selected to optimize the bandwidth, angular collimation, integrated reflectivity and spatial condensation characteristics of the exit beam. Optimum selection of asymmetry angle has been disclosed in relation to parallel multiply reflecting surfaces but the present inventor has appreciated that the optimum conditions where some spatial condensation of the beam is desired will be found to apply where the two asymmetry angles are not equal in magnitude and opposite in sign (i.e. parallel sided channel).

In an especially advantageous embodiment of the invention, the first and second aspects described above are combined into a single instrument, in which collimated x-rays or neutrons from the lens means are directed to the monochromator.

BRIEF DESCRIPTION OF THE DRAWINGS

The invention will now be further described, by way of example only, with reference to accompanying drawings, in which.

DETAILED DESCRIPTION OF THE INVENTION

Figure 1A:
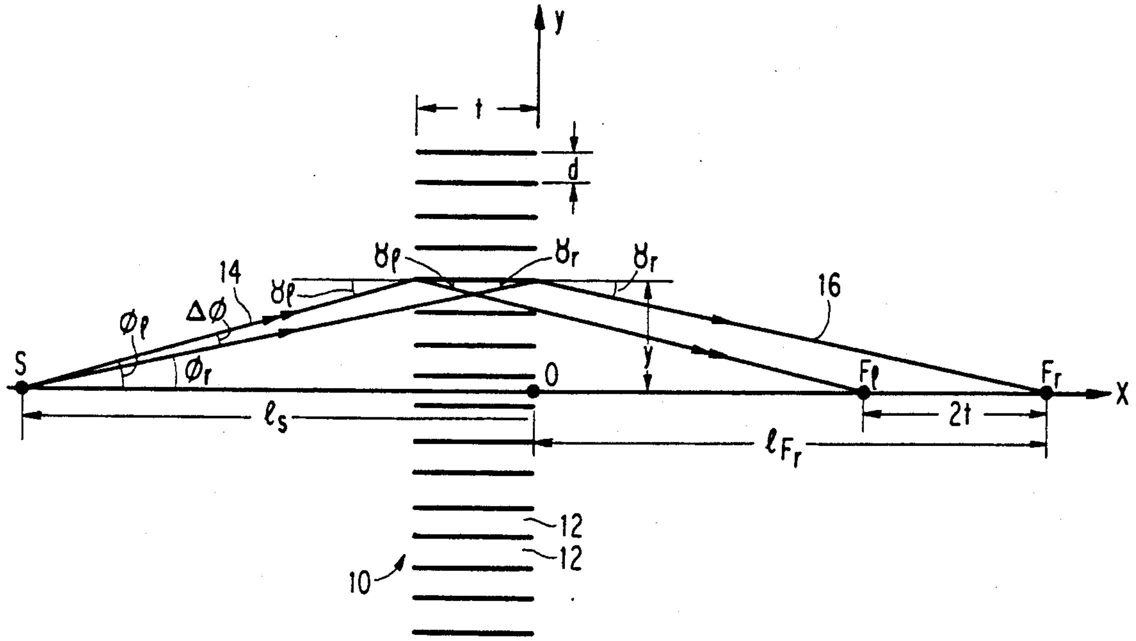
FIG. 1A is a schematic diagram of a simple focusing x-ray instrument according to the first aspect of the invention, showing ray lines for a single channel of the lens device incorporated therein.

By way of example of the first aspect of the invention, the simple case of a parabolically curved micro-channel plate with parallel faces will now be considered, with reference to FIG. 1A. The example is confined to the case of x-rays. For mathematical convenience, certain simplifying assumptions shall be applied to this example, viz that:

(i) the reflectivity of the channel walls is perfect (that is 100%) for x-rays incident on the walls at grazing angles up to the critical angle $\gamma_c$ for total external reflection;

(ii) the thickness of the walls is negligible relative to the diameter of the channels;

(iii) the focusing properties can be considered in one dimension at a time;

(iii) the x-rays emanate isotropically from a point source, at least over the small solid angular ranges relevant to the effective angular apertures of the device;

(v) the micro-channel plate consists of substantially parallel straight-walled channels perpendicular to the two parallel end faces of the plate; and (vi) at most single reflection occurs in the channels.

Assuming ray optics, the x-ray focusing properties of a flat (i.e. uncurved) two-dimensional, lens device according to the first aspect of the invention are illustrated in FIG. 1A. It will be better appreciated from what follows that this and the other diagrams are not to scale and exaggerate the size of the channels for purposes of illustration. Micro-capillary plate 10 has multiple tubular channels 12 which are elongate and open-ended. A divergent beam 14 from source S is focused as convergent beam 16 by plate 10. The reflection efficiency E at a point y above the origin O is here defined as:

$$E(y) = \frac{\Delta\phi^{ter}(y)}{\Delta\phi^{channel}(y)} \quad (1)$$

where $\Delta\phi^{ter}$ and $\Delta\phi^{channel}$ are respectively the angular apertures for total external reflection and for intercepting the cross-section of the channel at height y above the optic axis.

Integrated reflectivity refers to the integral of expression (1) over the full effective angular aperture of the focusing collimator and is an angle in radian measure. For illustrative purposes, and as noted in part at assumption (vi) above, the effective angular aperture of the device may be considered to be limited by the minimum of the angle at which double reflection in the channel begins to become possible and the angle at which total external reflection at the channel wall no longer becomes possible. In practice the aperture will usually be limited by the value of $\gamma_c$ rather than by the single reflection condition. For a given value of $\gamma_c$ (i.e. choice of channel-wall material), the optimum efficiency of the focusing device within the single reflection condition is given by choosing $$\frac{d}{t} = \gamma c \quad (2)$$

Calculations have been made for parameter values typical of the sorts of values which may be achieved for the devices in practice and which would be suitable (but not necessarily optimum) for achieving focusing. For example, the selected $\gamma_c$ value refers to quartz glass while the d/t value is typical of commonly available micro-channel plates. It has been found that integrated reflectivities of the order of 1 mrad in one-dimension are in principle possible with these parameter values (and 5 mrad if t/d were optimized in the manner described in (2) above). Integrated reflectivities of this order correspond to a flux increase of order 13 for GeIII Bragg reflection and CuKα radiation, if collimation is achieved to better than 15 seconds of arc.

If a focusing distance $l_F$ is desired for a source distance on the other side of the plate of $l_S$, then the channel at height y above the x axis, that is the central optical axis of the diverging x-ray beam emanating from source S, should be tilted by the angle w(y) given by:

$$w(y) = \frac{y}{\rho} = \frac{1}{2}\,\frac{[l_F - l_S]}{l_S\, l_F}\, y \quad (3)$$

where $\rho$ is the radius of curvature of the plate 10 required to produce w(y).

Figure 1B:
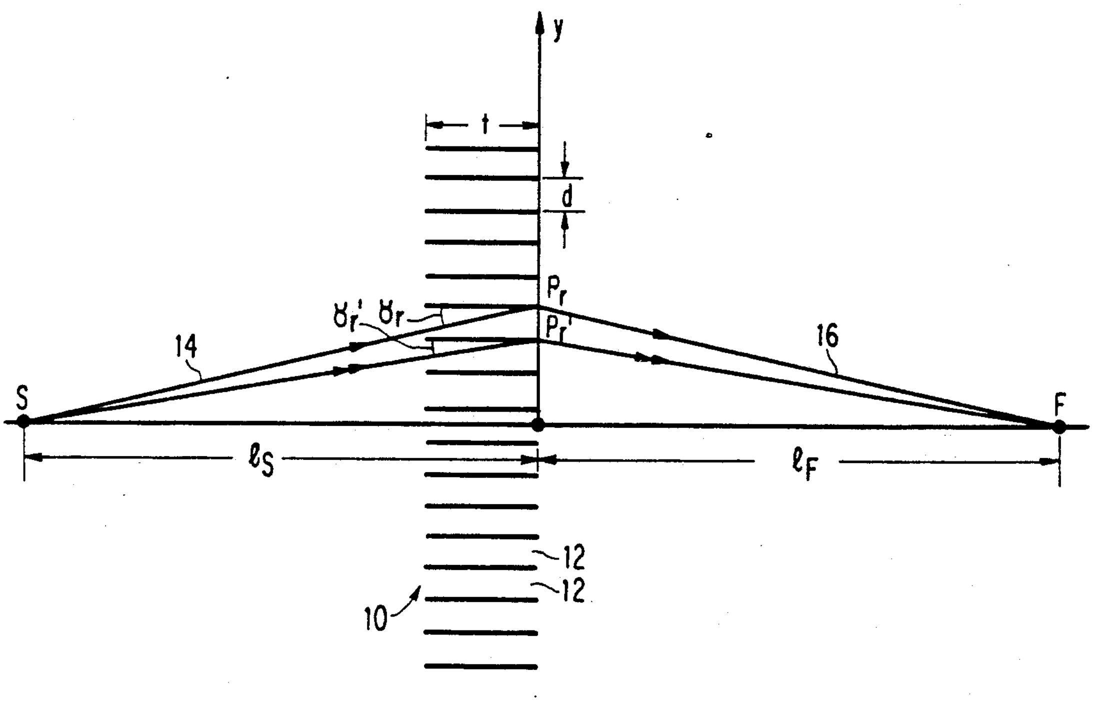
FIG. 1B depicts corresponding ray lines for adjacent channels in the instrument of FIG. 1A and 1B.
Figure 2:
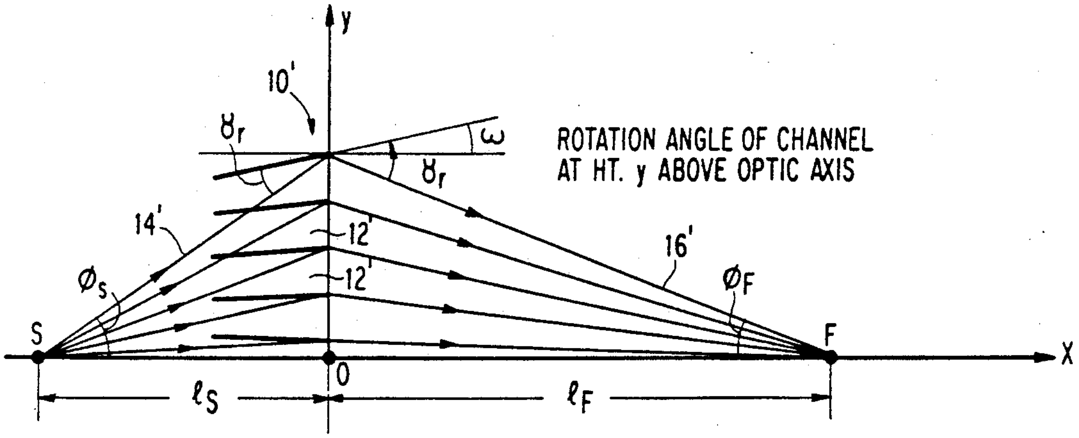
FIG. 2 is a schematic diagram of a second embodiment of the focusing x-ray instrument according to the first aspect of the invention and involves variable inclination of the reflecting surfaces in planes with normals perpendicular to the optical axis.

The general flat plate, parallel channel case is geometrically explained in FIG. 1A and 1B. The general focusing condition is shown in FIG. 2: here, the inclination of the channel side walls progressively change from channel to channel with increasing distance from the optical axis. The result is an enhanced focusing effect.

A special case of equation (3) occurs when $l_f$ equals infinity and corresponds to the production of a quasi-parallel x-ray beam from a point source. The geometry for this case is illustrated in FIG. 3.

Figure 3:
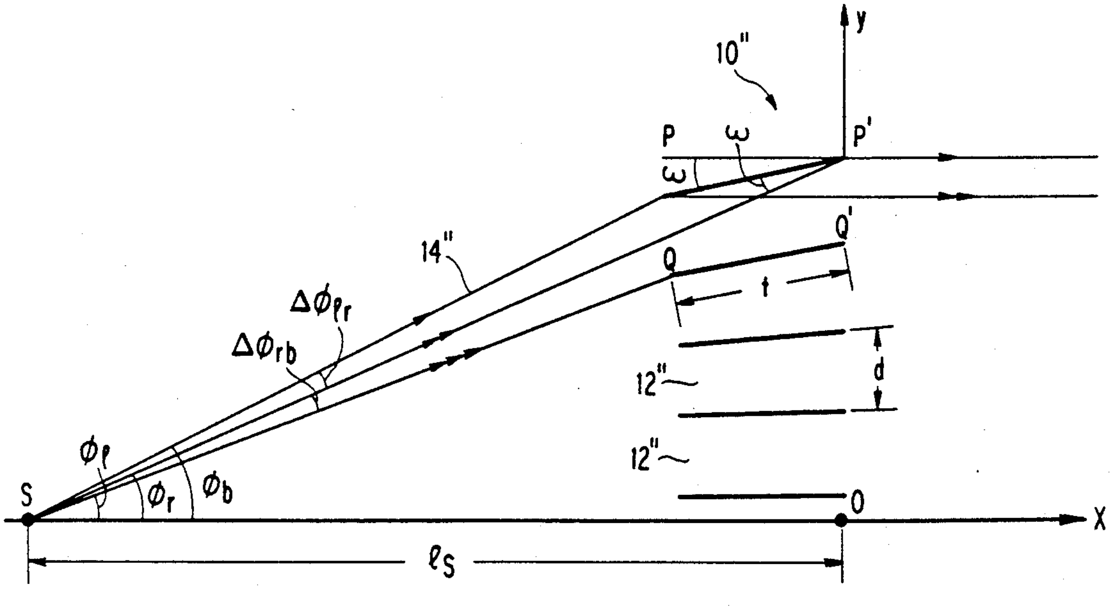
FIG. 3 is a schematic diagram of a collimating x-ray instrument according to the first aspect of the invention.

In FIG. 3, the side walls of each channel are curved end-to-end by virtue of the bending of the micro-capillary plate about the z axis: this is demonstrated by the parallelism of the emerging beam segments reflected by each channel side wall from a divergent beam segment received from source S.

By way of example, with reference to FIG. 3, where $l_S$ is 100 mm, the channel width and length are respectively 0.025 mm and 1.0 mm, and the critical angle $\gamma_c$ is 5 mrad, the bending displacement at y=10 mm from the axis of the x-ray beam passing through the plate is 0.25 mm. A bending of a micro-channel plate to this extent clearly involves no severe mechanical problems in practice. Alternatively, the curving of the micro-capillary plate may be carried out by slump forming on heating the plate above the appropriate glass softening temperature.

The channels may be tapered, shaped or may be of non-circular cross-section, e.g. hexagonal, to produce special or improved focusing effects, and to reduce off-axis aberrations.

The aforedescribed exemplification assumed that the thickness of the walls in the micro-capillary plate matrix is negligible relative to the diameter of the channels. In reality, a capillary to matrix cross-section ratio of about 50% is typical and this simply results in a reduced transmission intensity. However, by careful design of the micro-capillary plate, a capillary to matrix cross-section ratio as high as 90% is presently possible.

As mentioned, the principle of increasing inclination of the side walls of the channels, as shown in two dimensions in FIG. 3, may be readily extended to three dimensions by curving a micro-filament plate so that its outer and inner surfaces in which the channels open are of part paraboloidal formation. By varying the curve in the two dimensions, different effects can be produced in the respective dimensions, e.g. collimation in one plane and focusing to substantially a spot in the other.

Figure 4:
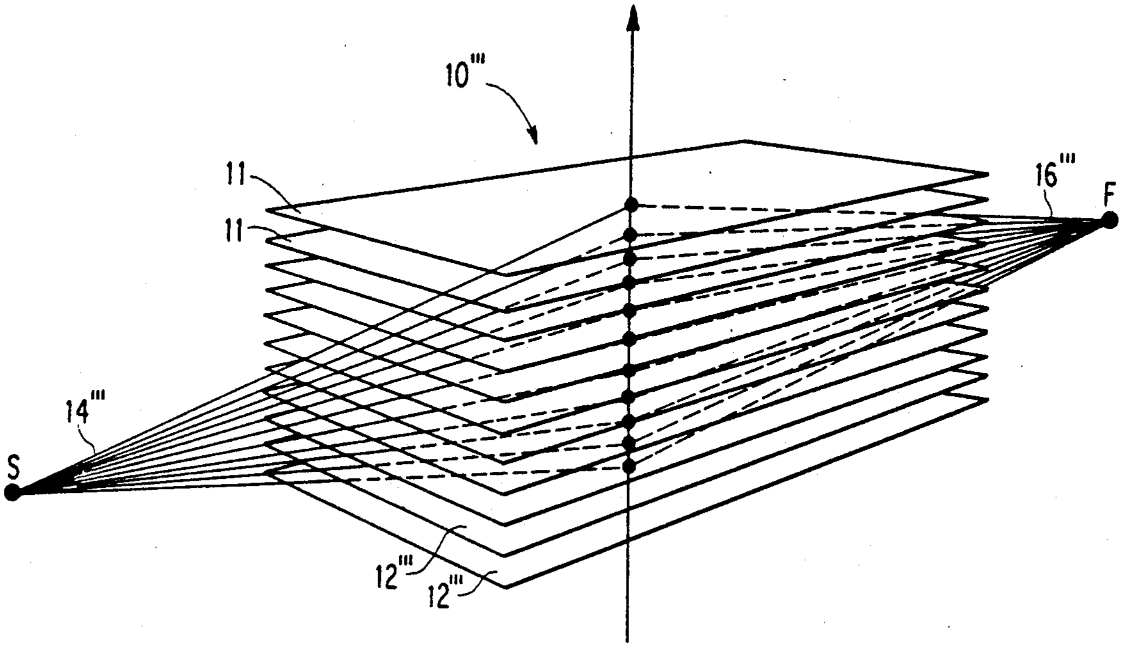
FIG. 4 is a schematic perspective diagram of a further embodiment of a focusing x-ray instrument utilising a stack of metal plates.

It will be understood that even in two dimension, a physical embodiment of the first aspect of the invention is possible in the form of a stack of thin x-ray mirror plates, and would have practical applications. FIG. 4 shows such an embodiment of lens device 10''' according to the first aspect of the invention. Multiple metal sheets 11 are fixed by suitable spacers (not shown) at uniform intervals in a stack. The sheets 11 are highly polished and reflective to x-rays, and the device is effective to focus a divergent x-ray beam from a source S substantially to a focus F. The sheets may be of variable increasing inclination and be curved under tension, as with the previously described embodiment. It will be seen that the cavities between the stack form multiple open-ended channels 12''' arranged across the optical path.

In a particular embodiment, an aperture may be formed in the lens device (in any of the above forms) to allow unimpeded propagation of a direct portion of the incident beam consistent with the collimation requirements of the instrument. This aperture may then be bordered by an x-ray lens device in accordance with the invention to gather additional x-ray flux outside the aperture. In general, the front and back faces of eg, plate 10 may be shaped to optimise performance according to desired parameters.

In an instrumental application, an x-ray lens device according to the first aspect of the invention may be provided in conjunction with an x-ray source tube, for example in place of the existing pin hole or rectangular slit aperture which is the effective source of x-rays from the tube.

A collimating and focusing device according to the first aspect of the invention provides a very practical and cost effective means for increasing the x-ray intensity and flux in a wide variety of x-ray scattering instruments such as x-ray powder diffractometers, four circle diffractometers, small-angle scattering systems and protein crystallography stations. It should also be of value in the construction of x-ray microprobes, microscopes and telescopes. This will be especially so where conventional systems use very primitive x-ray optics, such as narrow slits or pin hole collimation. Micro-channel and micro-filament plates are very well suited to mechanical and plastic deformation as a means to achieving the desired focusing or collimating properties, in contrast to the case of single crystal diffraction systems which are much more difficult to bend with a high risk of damage.

A closely similar application of such device also pertains to the case of collimating and focusing of neutrons.

The advantages of x-ray lens devices according to the first aspect of the invention include:

1. They are more compact (e.g. 1 or 2 mm thick) than, say, single-bore glass x-ray guide tubes (e.g. 20 cm long) and can focus with much shorter focal lengths so that they may be incorporated with minimal modification of existing instruments and the air path can be shorter leading to lower absorption losses in the air;
2. They are rigid with no moving parts in the device itself and are stable in an x-ray beam;
3. They are quite efficient;
4. They may be readily produced economically by mechanically bending of conventional micro-channel or micro-filament plates or can be moulded thermally to a wide variety of shapes in order to produce desired focusing properties in two or three dimensions;
5. They also act as short wavelength filter, hence reducing harmonic contamination when used in conjunction with x-ray monochromators.
6. Can produce focusing and collimation in 2-dimensions with a large effective angular aperture.
7. Capable of producing very short focal lengths. For example, conventional plate glass mirrors have a minimum focal length of the order of 1 m, whereas the device of the invention can achieve a focal length of the order of 1 cm.
8. Can allow for fine tuning of device in situ to optimize focusing properties.
9. Can automatically provide collimation out of the focusing plane due to their action of fine Soller slits.
10. Can be used to produce quasi-parallel beams from extended sources.

Table 1 is a summary of properties of some exemplary devices according to the first aspect of the invention, including an indication of a practical set of values for hypothetical but highly practical case.

SUMMARY OF PROPERTIES OF FOCUSING COLLIMATORS FOR A POINT SOURCE AND PARALLEL CHANNELS WITH WALLS OF NEGLIGIBLE THICKNESS

| | | FOCUSING TO A POINT | | FOCUSING TO A QUASI-PARALLEL BEAM | |
|---|---|---|---|---|---|
| 1. | maximum value of $\phi$ such that total external reflection can still occur in channel ($\phi^{ter}$) | $\gamma_c$ | ($5 \times 10^{-3}$) | $2\gamma_c$ | ($10 \times 10^{-3}$) |
| 2. | maximum value of $\phi$ such that at most only one reflection can occur in channel ($\phi^{apert}$) | $\frac{d}{t}$ | (0.025) | $\frac{2d}{t}$ | (0.05) |
| 3. | effective anngular semi-aperture of collimator ($\phi^{apert}$) | $\min\left[\frac{d}{t}, \gamma_c\right]$ | ($5 \times 10^{-3}$) | $\min\left[\frac{2d}{t}, 2\gamma_c\right]$ | ($10 \times 10^{-3}$) |
| 4. | semi-aperture of collimator on y-scale ($y^{apert}$) | $\min\left[l_s\frac{d}{t}, l_s\gamma_c\right]$ | (0.5 mm) | $\min\left[l_s\frac{2d}{t}, 2l_s\gamma_c\right]$ | (1.0 mm) |
| 5. | Reflection efficiency at y when aperture is $\gamma_c$ limited. | $\frac{t}{l_s d}\, y$ | (0.4 y) | $\frac{1}{2}\,\frac{t}{l_s d}\, y$ | (0.2 y) |
| 6. | mean efficiency averaged in 1-dimension out to effective aperture limit of system for $\gamma_c$ limited case. | $\frac{1}{2}\,\frac{t}{d}\,\gamma_c$ | (0.1) | $\frac{1}{2}\,\frac{t}{d}\,\gamma_c$ | (0.1) |
| 7. | intergrated reflectivity of focusing collimator when system is $\gamma_c$ limited (note factor of 2 to cover $\pm$ y contributions). | $2 \times \frac{1}{2}\,\frac{t}{d}\,\gamma_c^2$ | ($1 \times 10^{-3}$) | $2 \times \frac{t}{d}\,\gamma_c^2$ | ($2 \times 10^{-3}$) |
| 8. | bending locus for MCP in order to achieve focusing | $x = 0$ | | $x = -\frac{1}{4}\,\frac{1}{l_s}\,y^2$ | ($-0.0025\ y^2$) |
| 9. | bending requirements for sagittal focusing with $l_F^{sag} = l_s$ | $z = 0$ | | $z = 0$ | |
| 10. | integrated reflectivity if t/d value is optimized to match $\gamma_c$ (i.e. $d/t = \gamma_c$) | $2 \times \frac{1}{2}\,\gamma_c$ | ($5 \times 10^{-3}$) | $2 \times \gamma_c$ | ($10 \times 10^{-3}$) |
| 11. | distance to focus from 0 | $l_s$ | (100 mm) | $\omega$ | ($\infty$) |
| 12. | error in focusing along x - axis: | | | | |
| | (i) spatial spread | 2t | (2 mm) | . . . | |
| | (ii) angular divergence | $\frac{t}{(l_s - t)}$ | ($10 \times 10^{-3}$) | $\frac{1}{2}\,\frac{yt}{l_s^2}$ | ($0.05 \times 10^{-3}$) |

N.B. Values in parenthesis relate to values of relevant quantities when the following representative values of the key quantities are chosen: $\gamma_c = 5 \times 10^{-3}$ (rad.), $l_s = 100$ (mm), $\frac{t}{d} = 40$ and $t = 1$ (mm)

Figure 5:
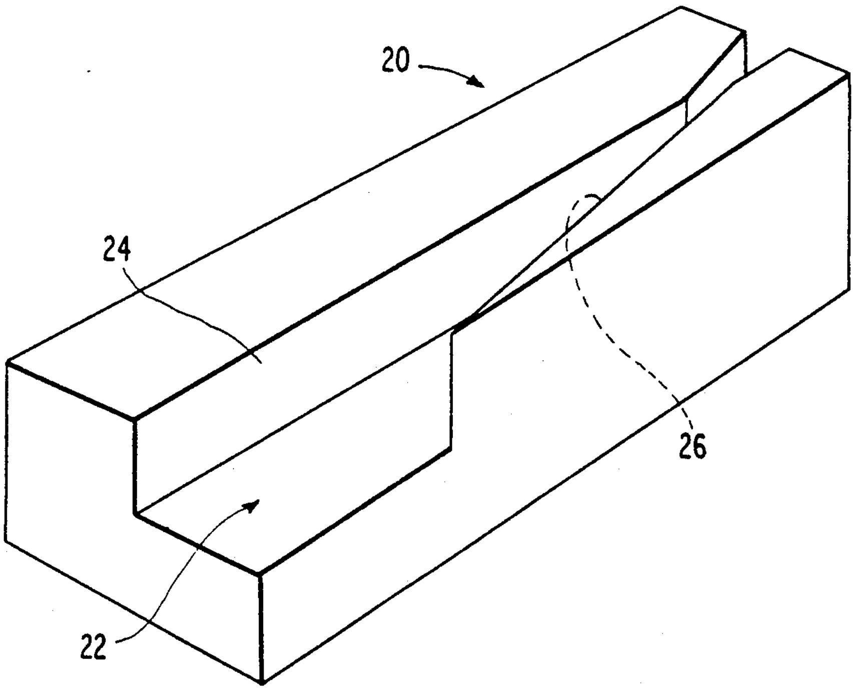
FIGS. 5 and 6 respectively schematically depict a perspective view and a plan view of a first embodiment of collimating monochromator in accordance with and second aspect of the invention.
Figure 6:
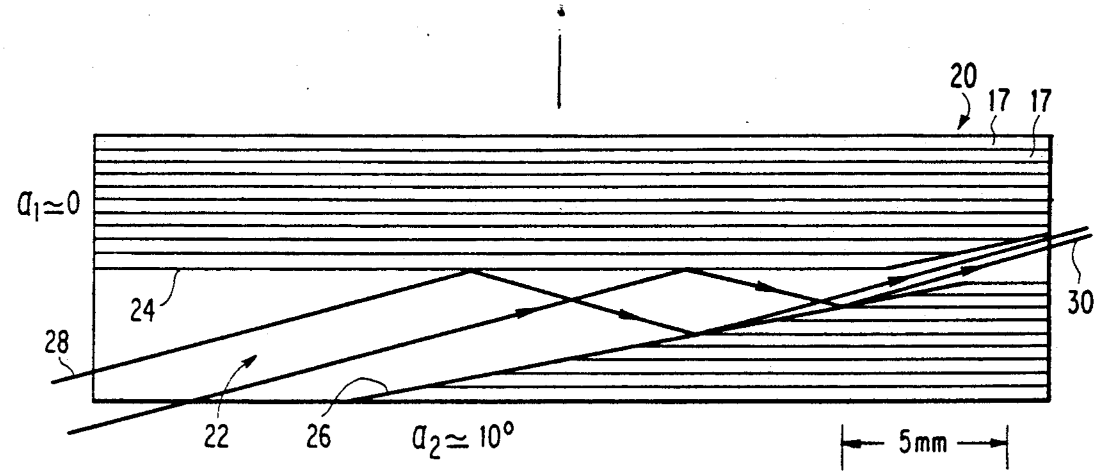
Figure 15A:
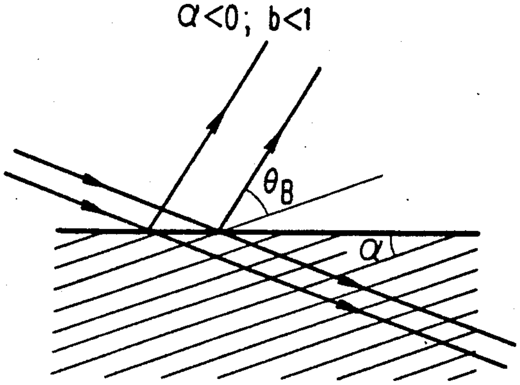
FIGS. 15A, 15B and 15C are explanatory diagrams of Bragg-reflection scattering geometry as understood herein, serving to indicate the definition of the asymmetry parameter and relied upon in this specification.
Figure 15B:
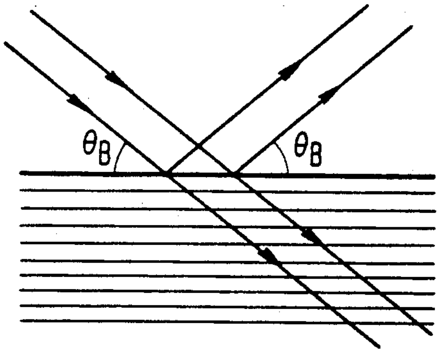
Figure 15C:
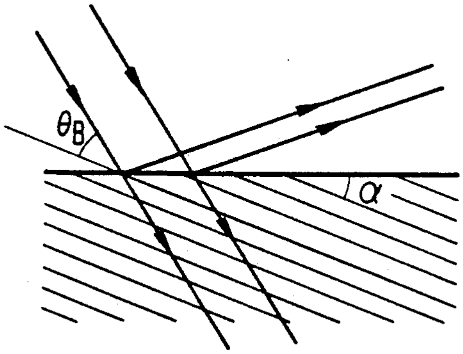

Turning now to the second aspect of the invention, the condensing-collimating channel-cut monochromator illustrated in FIG. 5 and 6 is a single perfect or nearly perfect-crystal of silicon, germanium or other suitable material. The crystal has been cut to form the converging channel 22 with opposed perpendicular lateral faces 24, 26. These faces are cut at respective angles, known as asymmetry angles (see FIG. 15), of $\alpha_l=0$, $\alpha_2=10°$ to the Bragg lll planes 17 of the crystal. In operation, the at least partially collimated incident x-ray beam 28 is multiply reflected and emerges as a relatively spatially condensed and angularly collimated pencil 30. Monochromator 20 is usually formed in silicon or germanium because of their ready availability in near perfect-crystal form and the reflections typically chosen are the lll reflections because they have the largest structure factor and so the largest wave-length band-pass or angular acceptance and hence lead to the highest integrated (with respect to angle of divergence at exit face) reflectivity from the monochromator. However, other reflections may be chosen and these may confer advantages in special cases.

Figure 7A:
FIGS. 7A and 7B images of an x-ray beam incident to the monochromator of FIGS. 5 and 6 and after it has traversed the monochromator respectively.
Figure 7B:
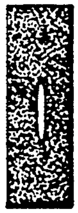

The channel-cut crystal monochromator of FIGS. 5 and 6 has been made in accordance with certain specified tolerances, viz that for CuK$\alpha_l$ radiation (1.54051 Angstrom), the emergent x-ray beam will have a FWHM angular divergence less than 1 minute of arc, a wavelength band-pass of the order of 2.5 by $10^{-4}$, and a spatial condensation factor of about 6. By the latter is meant that, in the plane of diffraction, the ratio of the width of the incident beam to emergent beam is about 6. An example spatial condensation of the beam is shown in FIG. 7, in which image A shows the beam incident to the monochromator and image B (on the same scale as image A) shows the emergent beam.

Figure 8:
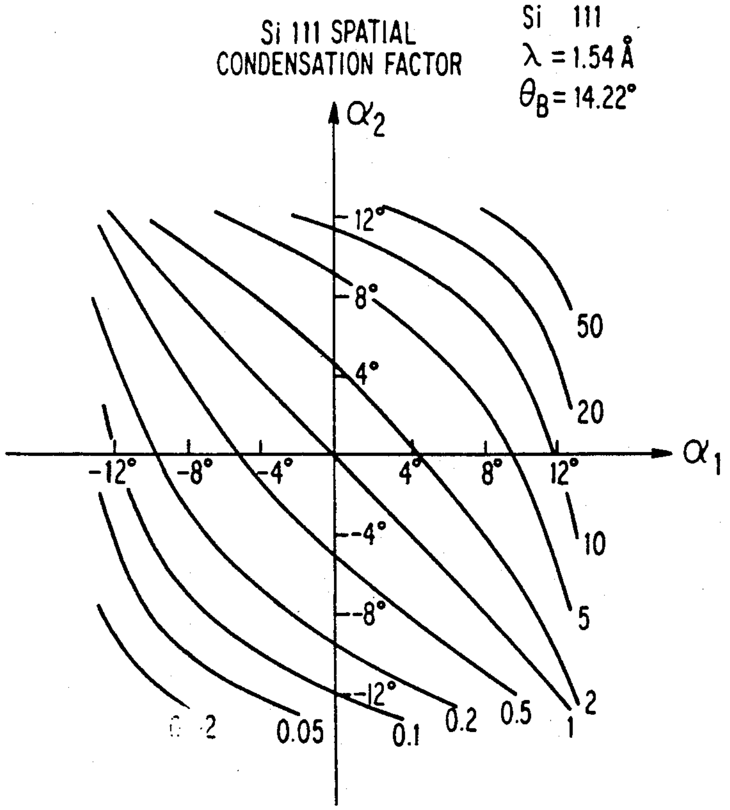
FIGS. 8 to 10 are graphical representations further explained below.
Figure 9:
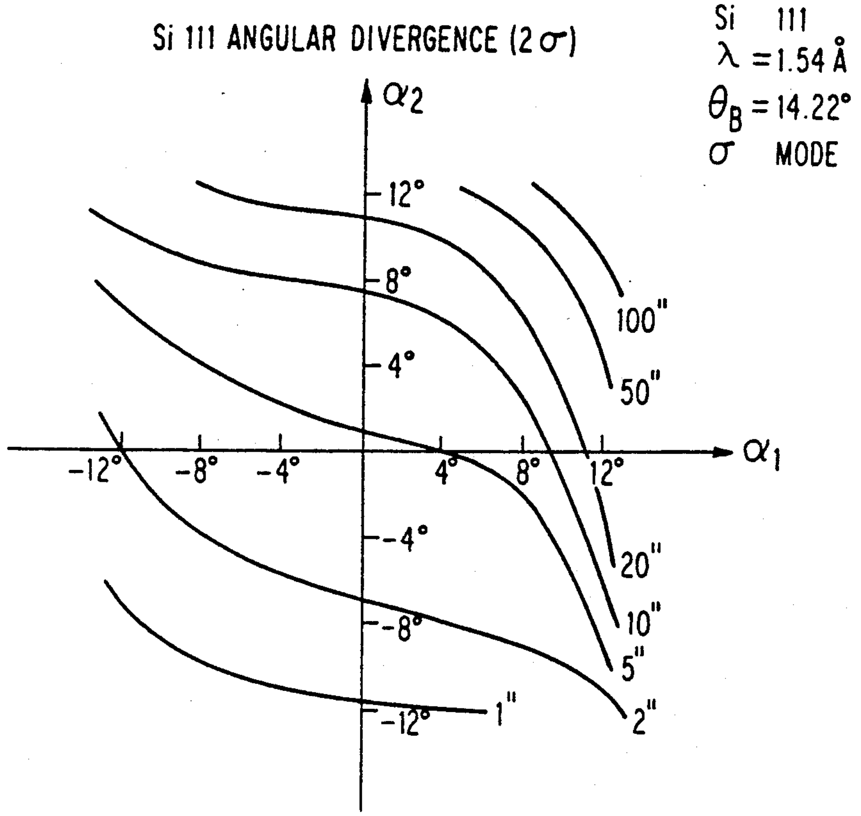

FIG. 8 is a contour plot of the spatial condensation factor, as just defined, for various values of the asymmetry angle, $\alpha_1$, at the first lateral face of the channel, plotted against values of the asymmetry angle, $\alpha_2$, at the second face. It will be seen that the spatial condensation factor increases with increasing $\alpha_1$ and that, for a given $\alpha_1$ value, increasing values of $\alpha_2$ further enhance the condensing effect. However, these observations must be considered together with the effects of varying asymmetry angles on bandwidth, angular collimation and integrated reflectivity. For example, FIG. 9 is a contour plot of the full width of the reflectivity curve (that is the reflectivity versus the angle of divergence of the existing beam) taken as twice the standard deviation of the reflectivity distribution.

Figure 10:
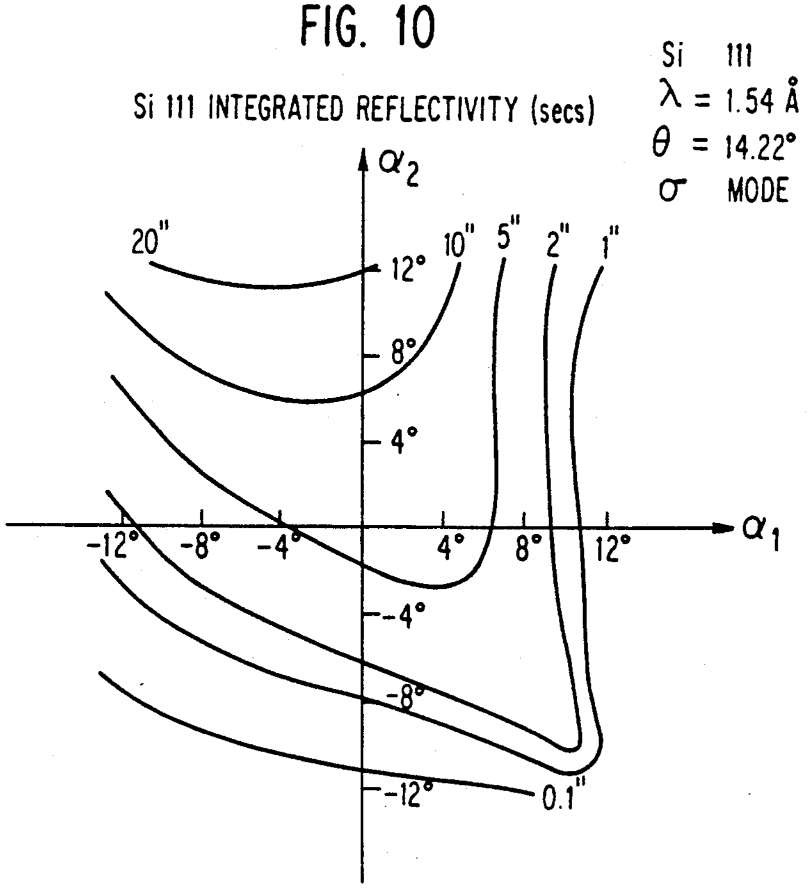

FIG. 10 is a contour plot of integrated reflectivity (i.e. reflectivity integrated with respect to angle of divergence at the exit face of monochromator) versus the asymmetry angle $\alpha_2$ for various values of $\alpha_1$. It will be noted that for a given value of $\alpha_1$, the integrated reflectivity tends to increase with increase in $\alpha_2$.

It seems from these curves that a good net result for silicon lll planes and CuK$\alpha$ radiation is obtained for $\alpha_1=0$ and $\alpha_2=+10°$. A significant improvement in spatial condensation is obtained with this difference relative to no difference (FIG. 8) and integrated reflectivity is still quite high (FIG. 10), while angular collimation remains within acceptable limits and certainly below the aforementioned criterion of 1 minute of arc.

Figure 11A:
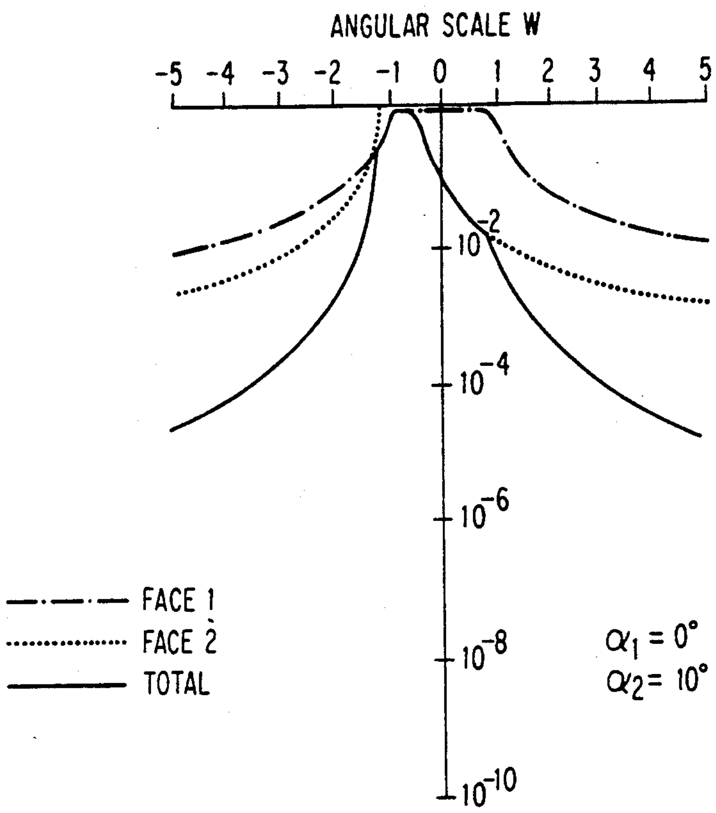
FIGS. 11A, 11B and 11C show selected individual-face and total reflectivity curves for perfect-crystal faces in the embodiment of FIGS. 5 and 6 and in other embodiments with different asymmetry angles.
Figure 11B:
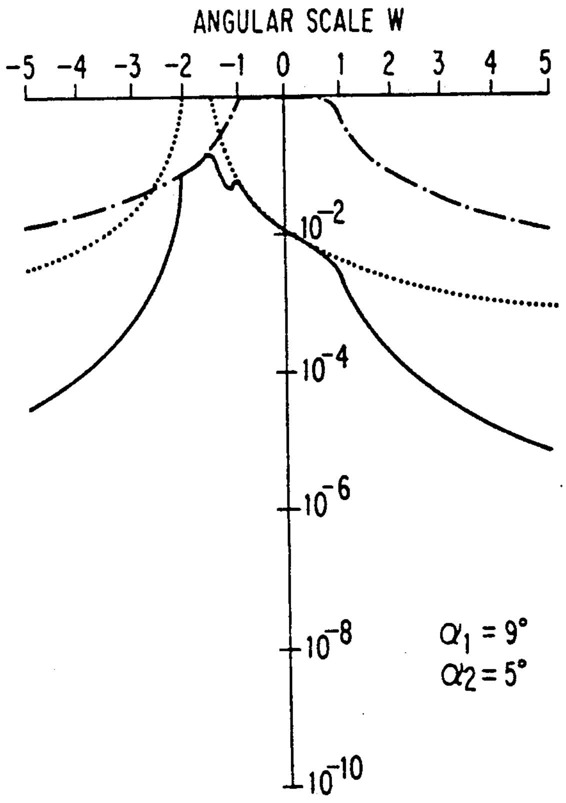
Figure 11C:
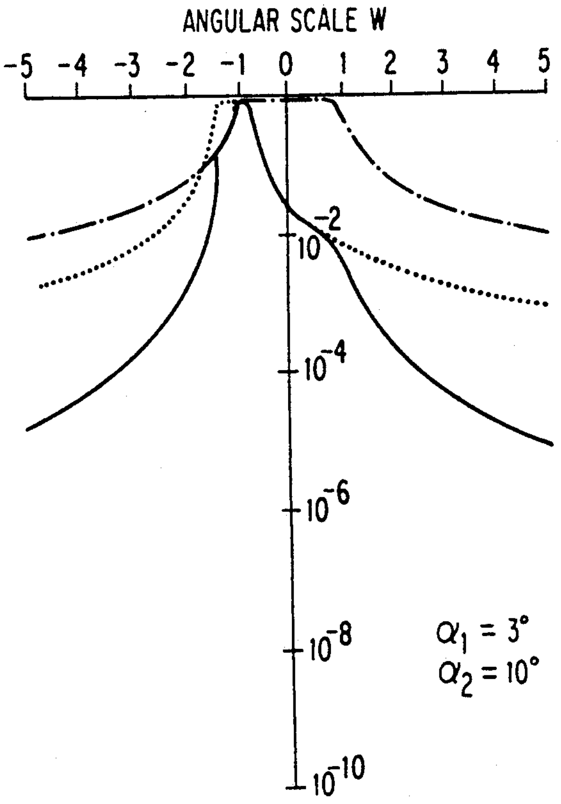

For general choices of asymmetry angles for multiple reflections in a channel, the net reflectivity curve must be calculated as the product for each face treated according to the dynamical theory of x-ray diffraction. FIG. 11 shows the individual and integrated reflection curves for the ideal case (graph A), at which, as mentioned, $\alpha_l=0$ and $\alpha_2=10°$, and for two less satisfactory arrangements (graph B: $\alpha_1=9°$, $\alpha_2 5°$ and graph C: $\alpha_1=3°,\alpha_2=10°$). The former reduces the final intensity and the latter gives too sharp a peak in the net curve.

The reflectivity peak for a single reflection from a perfect-crystal falls off quite slowly with angle (as can be seen in FIG. 11), with the result that long tails may occur in the primary beam coming off the monochromator and swamp the small-angle scattering intensity from the sample. Bonse and Hart showed that the undesirable tails in the beam coming rom a perfect-crystal could be reduced in intensity by man orders of magnitude, with negligible reduction in peak intensity, by using multiple reflections in a parallel-face channel-cut monochromator. For parallel faces in a channel, the reflectivity curve for a series of m identical pairs of reflections in a channel is just the $m^{th}$ power of the reflectivity curve for one pair. This relationship is not so for general choices of asymmetery angles for multiple reflections in a channel but the overall effect remains: the net reflectivity is the product of the individual reflectivities for the individual faces. The embodiment of FIGS. 5 and 6 uses a small number of such reflections-and the reduction of the tails can be seen in FIG. 11. The tails may be reduced even further by careful design involving increasing the numbers of faces. This may involve splitting up one or both faces of the channel.

Figure 12:
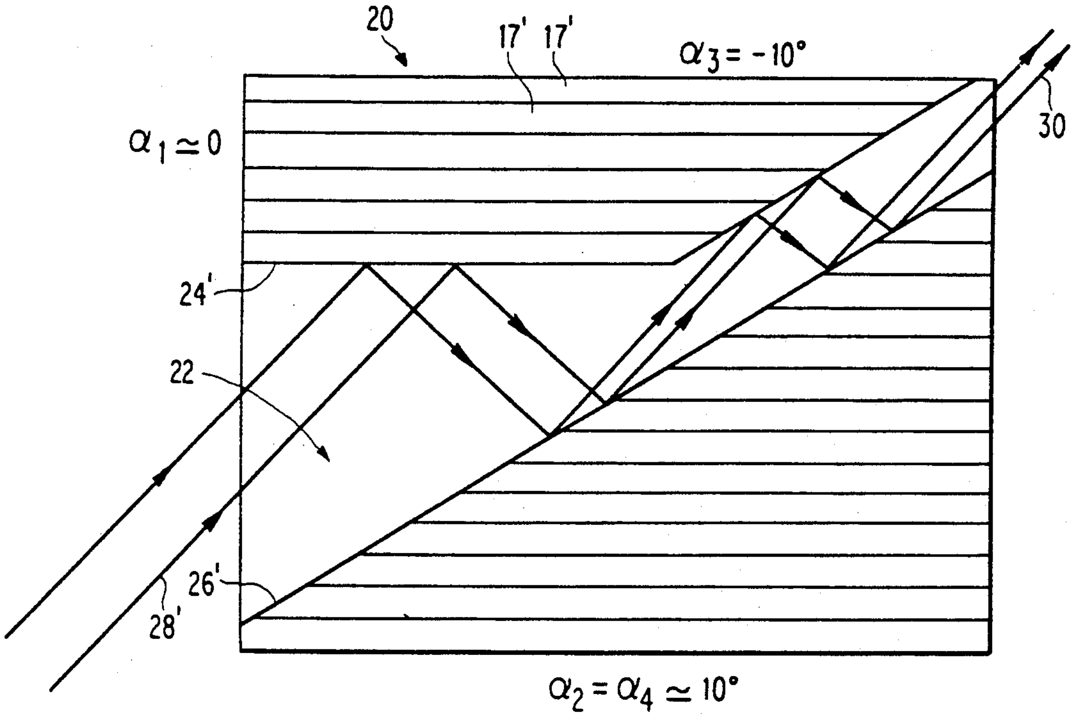
FIG. 12 is a schematic plan view of a further embodiment of monochromator according to the second aspect of the invention.
Figure 13:
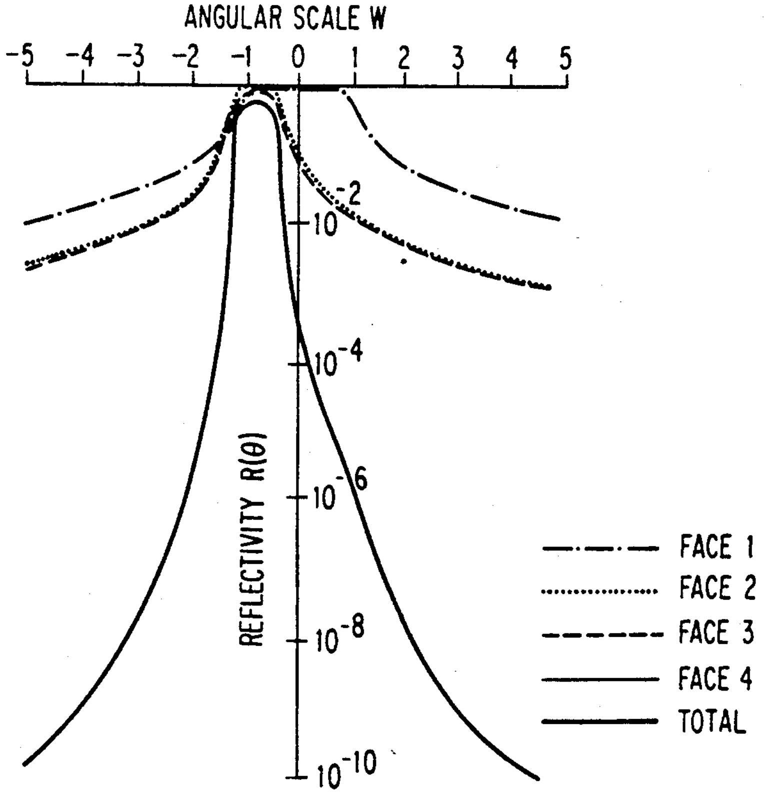
FIG. 13 shows individual face and total reflectivity curves for the embodiment of FIG. 12.

FIG. 12 diagrammatically depicts one such design viewed in plan with values for $\alpha_1=0°$, $\alpha_2=10°$, $\alpha_3=-10°$ and $\alpha_4=10°$ respectively for the four successive reflections in the monochromator. The reflectivity curves for the faces and for the device as a whole are depicted in FIG. 13. This embodiment has high reflectivity in the central range of Bragg reflection but in addition has the desirable property that the Bragg tails fall off as approximately the eights power of the angular devation from the Bragg condition.

It should be noted that, the net spatial condensation factor for a monochromator with reflectance at m faces is the product of the spatial condensations at the individual faces.

In the case where beams possessing a high-degree of plane polarization are required, this may be achieved by choosing reflections having $2\theta_B$ (i.e. twice the Bragg angle) close to 90° for the given wavelength. For example, for CuK$\alpha$, the 333 or 511 reflections of silicon or germanium are suitable.

Although the discussion above of channel-cut monochromators in accordance with the second aspect of the invention has been in terms of parallel-beam optics, improvements in integrated reflectivity of such devices is clearly possible if the faces of the monochromator are suitably bent or if surface modification is carried out, for example, by ion implantation, liquid phase epitaxy or molecular-beam epitaxy. Since reflectivity of a perfect crystal depends on atomic number, one approach would be to grow an epitaxial layer or implant and anneal a heavier atom material at or near the surface of a perfect crystal of, e.g. silicon. Similarly, production of a lattice parameter gradient perpendicular to the diffracting planes, for example by the sort of means mentioned above, leads to an increase in the width of the reflectivity curves in a manner very similar to that of crystal bending. Variation of lattice parameters parallel to the diffracting planes can also lead to a one or two dimensional focusing effect similar to that achievable by bending.

Figure 16:
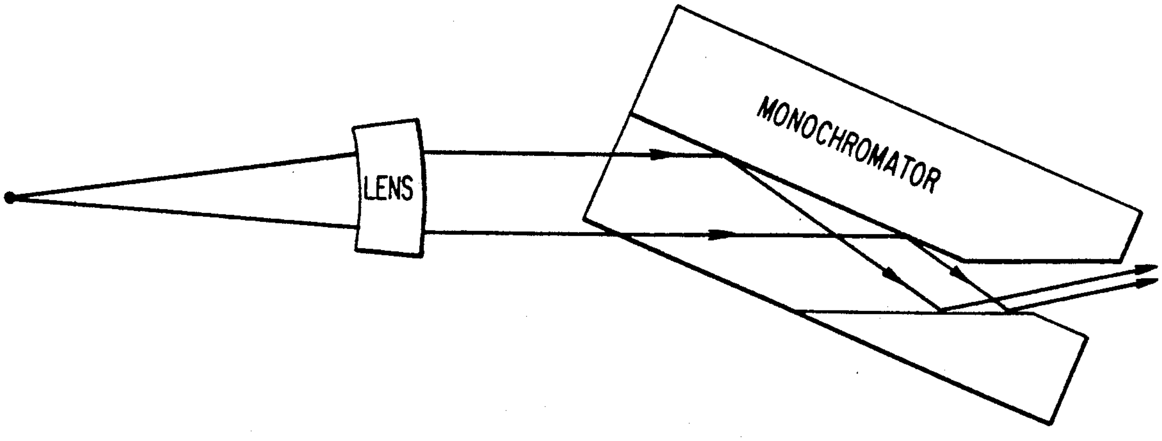
FIG. 16 is a schematic view showing the relationship of the lens relative to the source and the monochromator.

Improvements in transmitted power of the monochromator system of the second aspect of the invention may be achieved by use of a pre-collimator such as a bent crystal monochromator with lattice parameter gradient or x-ray mirror, or a lens means according to the first aspect of the invention. The ideal incident beam for the monochromator is collimated at least to some extent and the device of the first aspect of the invention is ideal for such pre-collimation. The monochromator of itself accepts a maximum angle or divergence in the incident beam of approximately 15″; the angular acceptance from the source can be increased from 15″ to 1½° by use of the lens device of the first aspect of present invention between the source and the monochromator as shown in FIG. 16.

Figure 14:
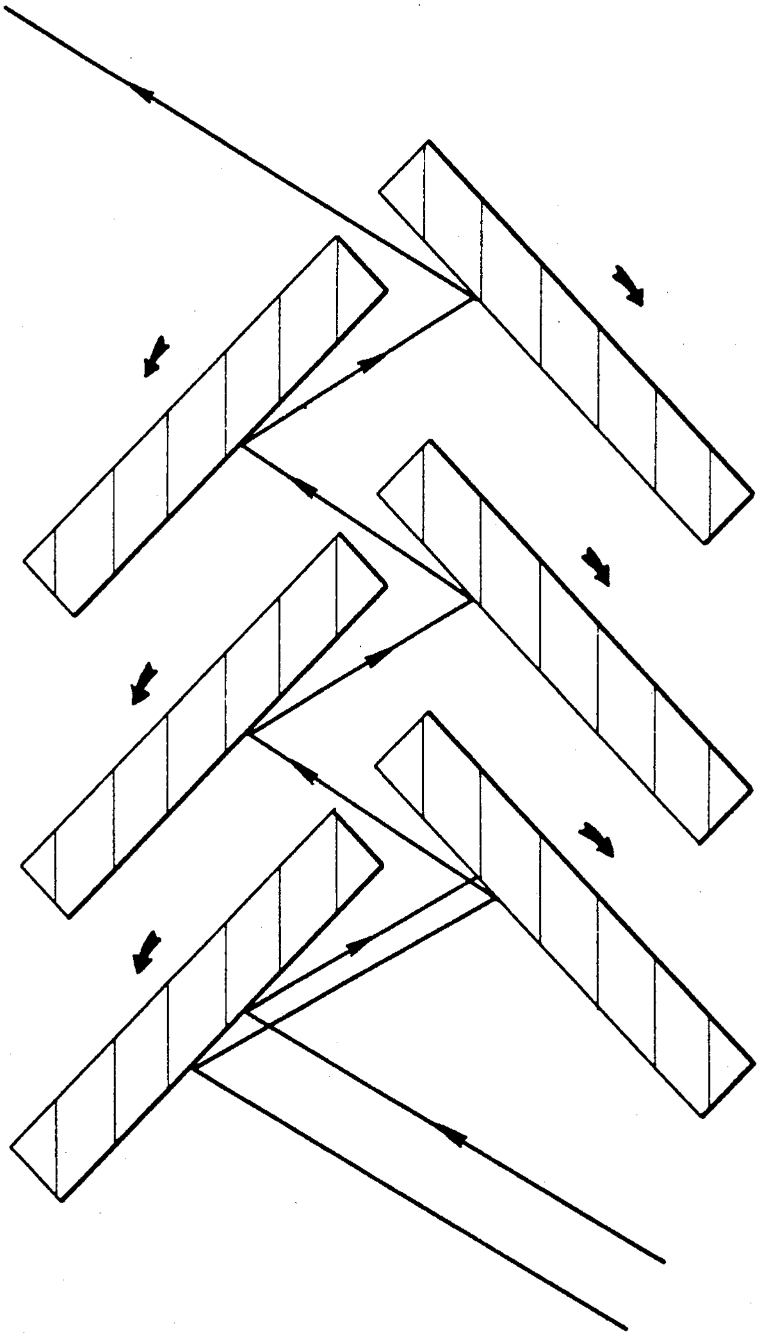
FIG. 14 is a schematic plan view of a still further embodiment of monochromator according to the second aspect of the invention.

In more advanced versions of the present types of monochromators, the degree of overlap of the two reflectivity curves, and hence the angular divergence of the beam coming from the monochromator, could be varied extrinsically by making a flexure cut in the monochromator and by using a piezo-electric or electro-magnetic transducer to vary the angle between the sets of Bragg planes corresponding to each face. An arrangement adaptable to this varability is shown in FIG. 14. Such an extension of the invention makes possible the development of compact multi-stage beam-condensing monochromators of ultimate beam condensing power, estimated to be of the order of 1 micron or less, and typically limited by the depth of penetration of the x-ray beam into the crystal face.

The monochromator of the invention is of particular value in small-angle x-ray scattering and x-ray powder diffraction systems in that the incident beam on the sample is condensed to a width consistent with the detector pixels of position-sensitive detectors. The monochromator would also be valuable in x-ray microprobes for x-ray fluoresence analysis, scanning x-ray probes and for medical diagnostic and clinical purposes, in scanning x-ray lithography and as analyser crystals in powder diffractometers and fluorescence spectrometers.

The described arrangement has been advanced merely by way of explanation and many modifications may be made thereto without departing from the spirit and scope of the invention which includes every novel feature and combination of novel features herein disclosed.

I claim:

1. An x-ray or neutron instrument incorporating a source of x-rays or neutrons, x-ray or neutron lens means disposed in a path for x-rays or neutrons emitted by said source, the lens means comprising an array of multiple channels being elongate open-ended but laterally closed ducts arranged across the path to receive and pass segments of an x-ray or neutron beam occupying said path, which channels have side walls reflective to x-rays or neutrons of said beam incident at a grazing angle less than the critical grazing angle for total external reflection of the x-rays or neutrons, whereby to cause substantial focusing or collimation and/or concentration of the thus reflected x-rays or neutrons, each of said channels having a diameter to length ratio between one and two times said critical grazing angle whereby to achieve optimum efficiency with one reflection of the respective said beam segment in each channel.

2. An instrument according to claim 1 wherein the inclinations of said side walls are uniform in each channel but progressively change from channel to channel with respect to the optical axis of said path whereby to enchance focusing or collimation of said incident beam.

3. An instrument according to claim 1, wherein said channels are ducts defined by a curved lateral wall.

4. An instrument according to claim 1, wherein said channels are cylindrical ducts.

5. An instrument according to claim 1 wherein said channels are hollow capillaries or bores.

6. An instrument according to claim 1 wherein said channels are defined collectively by a micro-capillary or micro-channel plate.

7. An instrument according to claim 6 wherein said plate comprises a multiplicity of hollow optical fibres.

8. An instrument according to claim 6 wherein said micro-capillary plate is curved so that the angular tilts of the reflecting side walls in the channels vary parabolically with distance perpendicular to the optical axis.

9. A method of focusing, collimating and/or concentrating an x-ray or neutron beam, comprising directing the beam into the open ends of an array of multiple channels being elongate open-ended but laterally closed ducts which have side walls reflective to said x-rays or neutrons incident at a grazing angle less than the critical grazing angle for total external reflection of the x-rays or neutrons, at least a portion of said beam being incident at a grazing angle less than said critical grazing angle so that the beam is at least in part focused or collimated, each of said channels having a diameter to length ration between one and two times said critical grazing angle whereby to achieve optimum efficiency with one reflection of the respective said beam segment in each channel.

10. A method according to claim 9, wherein said channels are ducts defined by a curved lateral wall.

11. A method according to claim 9, wherein said channels are cylindrical ducts.

12. An instrument according to claim 1 further including a source of x-rays and, optionally, a slit assembly, monochromator, sample holder and/or adjustable detector.

13. An instrument according to claim 1 as a pre-collimator in combination with a condensing-collimating channel cut monochromator to which collimated x-rays or neutons are directed from said lens means, said monochromator comprising a channel in a perfect-crystal or near perfect-crystal body, which channel is formed with lateral surfaces which multiply reflect, by Bragg diffraction from selected Bragg planes, an incident beam which has been collimated at least to some extent, wherein said lateral surfaces are at a finite angle to each other whereby to monochromatize and spatially condense said beam as it is multiply reflected, without substantial loss of reflectivity or transmitted power.

14. An instrument according to claim 13 wherein said lateral surfaces of the channel are so selected that, by virtue of the partial overlap of their reflectivity curves, the monochromator also further collimates said incident beam.

15. An instrument according to claim 13 wherein the respective asymmetry angles for said lateral surfaces (i.e. the angles between the respective surfaces and said selected Bragg plane) are jointly selected to optimize the bandwidth, angular collimation, integrated reflectivity and spatial condensation of the exit beam.

16. An instrument according to claim 15 including means to vary said finite angle.

17. An instrument according to claim 16 wherein the selected Bragg planes are the lll planes and the asymmetry angles for said lateral surfaces with respect to these planes are respectively $\alpha_1=0$ at $\alpha_2=10°$, in the order of reflection.

18. An instrument according to claim 17 wherein said incident beam is reflected at plural parallel lateral faces in said crystal, to reduce the intensity of the Bragg tails.

19. A condensing-collimating channel-cut monochromator comprising a channel in a perfect-crystal or near perfect-crystal body, which channel is formed with lateral surfaces which multiply reflect, by Bragg diffraction from selected Bragg planes, an incident beam which has been collimated at least to some extent, wherein said lateral surfaces are at a finite angle to each other whereby to monochromatise and spatially condense said beam as it is multiply reflected, without substantial loss of reflectivity or transmitted power, wherein the respective asymmetry angles for said lateral surfaces (i.e. the angles between the respective surfaces and said selected Bragg plane) are jointly selected to optimize the bandwidth, angular collimation, integrated reflectivity and spatial condensation of the exit beam by correlated reference to data relating these parameters to selectable asymmetry angles.

20. A monochromator according to claim 19 wherein said lateral surfaces of the channel are so selected that, by virtue of the partial overlap of their reflectivity curves, the monochromator also further collimates said incident beam.

21. A monochromator according to claim 20 including means to vary said finite angle.

22. A monochromator according to claim 21 wherein the selected Bragg planes are the lll planes and the asymmetry angles for said lateral surfaces with respect to these planes are respectively $\alpha_1=0$ and $\alpha_2=10°$, in the order of reflection.

23. A monochromator according to claim 22 wherein said incident beam is reflected at plural parallel lateral faces in said crystal, to reduce the intensity of the Bragg tails.

24. A method of spatially condensing a beam of radiation, e.g. of x-rays or neutrons, which has been collimated at least to some extent, comprising directing the beam into a channel in a perfect-crystal or near perfect-crystal body, which channel is formed with lateral surfaces which multiply reflect said incident beam by Bragg diffraction from selected Bragg planes, wherein said lateral surfaces are at a finite angle to each other whereby to monochromatise and spatially condense said beam as it is multiply reflected, without substantial loss of reflectivity or transmitted power, wherein the respective asymmetry angles for said lateral surfaces (i.e. the angles between the respective surfaces and said selected Bragg plane) are jointly selected to optimize the bandwidth, angular collimation, integrated reflectivity and spatial condensation of the exit beam by correlated reference to data relating these parameters to selectable asymmetry angles.

25. An x-ray or neutron instrument incorporating x-ray or neutron lens means disposed in a path for x-rays or neutrons in the instrument, the lens means comprising multiple elongate open-ended channels arranged across the path to receive and pass segments of an x-ray or neutron beam occupying said path, which channels have side walls reflective to x-rays or neutrons of said beam incident at a grazing angle less than the critical grazing angle for total external reflection of the x-rays or neutrons, whereby to cause substantial focusing or collimation and/or concentration of the thus reflected x-rays or neutrons, said instrument further comprising an x-ray or neutron monochromator positioned to receive focused, collimated or concentrated x-rays or neutrons from said lens means.

26. A condensing-collimating channel-cut monochromator comprising a channel in a perfect-crystal or near perfect-crystal body, which channel is formed with lateral surfaces which multiply reflect, by Bragg diffraction from selected Bragg planes, an incident beam which has been collimated at least to some extent, wherein said lateral surfaces are at a finite angle to each other whereby to monochromatise and spatially condense said beam as it is multiply reflected, without substantial loss of reflectivity or transmitted power, wherein said body further includes plural parallel lateral faces in said crystal, arranged to multiply reflect the monochromatised and condensed beam, whereby to reduce the intensity of the Bragg tails.

* * * * *

UNITED STATES PATENT AND TRADEMARK OFFICE
CERTIFICATE OF CORRECTION

PATENT NO. : 5,016,267

DATED : May 14, 1991

INVENTOR(S) : Stephen W. WILKINS

It is certified that error appears in the above-identified patent and that said Letters Patent is hereby corrected as shown below:

On the title page, item [73] insert the following:

-- Commonwealth Scientific and Industrial Research Organisation --

Signed and Sealed this

Second Day of May, 1995

Attest:

BRUCE LEHMAN

*Attesting Officer*

*Commissioner of Patents and Trademarks*